US006223208B1

(12) United States Patent
Kiefer et al.

(10) Patent No.: US 6,223,208 B1
(45) Date of Patent: Apr. 24, 2001

(54) MOVING DATA IN AND OUT OF PROCESSOR UNITS USING IDLE REGISTER/STORAGE FUNCTIONAL UNITS

(75) Inventors: Kenneth J. Kiefer; David A. Luick; John Christopher Willis, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/943,260

(22) Filed: Oct. 3, 1997

(51) Int. Cl.$^7$ ....................................................... G06F 9/00
(52) U.S. Cl. ............................................................ 709/108
(58) Field of Search ..................................... 709/302, 308, 709/1, 100, 102, 104, 107, 108; 395/573, 595; 712/42, 43, 228, 242, 243, 245

(56) References Cited

U.S. PATENT DOCUMENTS

| | | | |
|---|---|---|---|
| 5,008,812 | 4/1991 | Bhandarkar et al. | 364/200 |
| 5,197,138 | 3/1993 | Hobbs et al. | 395/375 |
| 5,349,656 | * 9/1994 | Kaneko et al. | 709/302 |
| 5,357,617 | * 10/1994 | Davies et al. | 395/595 |
| 5,404,469 | * 4/1995 | Chung et al. | 395/91 |
| 5,428,779 | * 6/1995 | Allegrucci et al. | 709/308 |
| 5,713,038 | * 1/1998 | Motomura et al. | 395/800.41 |
| 5,872,985 | * 2/1999 | Kimura | 395/800.01 |

FOREIGN PATENT DOCUMENTS

| | | | |
|---|---|---|---|
| 63-52240 | 5/1988 | (JP) | G06F/9/46 |
| 9207335 | 4/1992 | (WO) | G06F/15/78 |

OTHER PUBLICATIONS

Cray–2 Computer System Hardware Reference Manual, HR–2000, CRI Draft 08/84.

ACM Sigplan Notices, vol. 29, No. 4, Apr. 1994, "Developing An Interprocedural Optimizing Compiler" by Jon Loeliger et al, pp. 41–48.

IEEE Design & Test of Computers, Sep. 1992, "Optimizing VHDL Compilation for Parallel Simulation" by John C. Willis et al, pp. 42–53.

IBM Technical Report TR07.2232, Aug. 24, 1995, "What is Data–driven, Multithreaded Architecture?" by Dr. John Willis et al, pp. 1–21.

Proceedings of the International Workshop on Programming Environments for Intelligent Systems, 1985, "RapidGraph: An Object Flow Multiprocessor" by J. C. Willis et al.

* cited by examiner

Primary Examiner—St.-John Courtenay, III
Assistant Examiner—George Opie
(74) Attorney, Agent, or Firm—Karuna Ojanen

(57) ABSTRACT

In a computer system and a processor which has the capability to do multithreaded processor, the computer system and processor use idle register/storage functional units within the processor core to transfer the state of a thread out of the processor to memory or from memory to the processor core. The register/storage functional units are interrogated dynamically so that this transfer occurs only when the register/storage functional units are idle and not being used for normal instructions. Thus, a state may be transferred in whole if there are many cycles when the register/storage functional unit is idle or it may be transferred in part if there an insufficient number of no-op instructions for the entire state. A context switch unit in the processor then has appropriate registers and logic control to keep track of the state of the thread that is being "idly" transferred and then transfer the remaining registers when a register/storage functional is available or "idle."

9 Claims, 6 Drawing Sheets

MOVING DATA IN AND OUT OF PROCESSOR UNITS USING IDLE REGISTER/STORAGE FUNCTIONAL UNITS

This invention relates generally to a computer apparatus and a method to enable multithreading capabilities, and more particularly to a computer and method that uses idle register/storage functional units in a processor core to dynamically exchange threads.

BACKGROUND OF THE INVENTION

The fundamental structure of a modern computer includes peripheral devices to communicate information to and from the outside world; such peripheral devices may be keyboards, monitors, tape drives, communication lines coupled to a network, etc. Also included in the basic structure of the computer is the hardware necessary to receive, process, and deliver this information from and to the outside world, including busses, memory units, input/output (I/O) controllers, storage devices, and at least one central processing unit (CPU), etc. The CPU is the brain of the system. It executes the instructions which comprise a computer program and directs the operation of the other system components.

From the standpoint of the computer's hardware, all systems, from the earliest to the most modern, operate in fundamentally the same manner. Processors actually perform very simple operations quickly, such as arithmetic, logical comparisons, and movement of data from one location to another. Programs which direct a computer to perform massive numbers of these simple operations give the illusion that the computer is doing something sophisticated. What is perceived by the user as a new or improved capability of a computer system, however, may actually be the machine performing the same simple operations, but much faster. Therefore, continuing improvements to computer systems require that these systems be made ever faster.

One measurement of the overall speed of a computer system, also called the "throughput", is measured as the number of operations performed per unit of time. Conceptually, the simplest of all possible improvements to system speed is to increase the clock speeds of the various components, particularly the clock speed of the processor. So that if everything runs twice as fast but otherwise works in exactly the same manner, the system will perform a given task in half the time. Computer processors which were constructed from discrete components years ago performed significantly faster by shrinking the size and reducing the number of components; eventually the entire processor was packaged as an integrated circuit on a single chip. The reduced size made it possible to increase the clock speed of the processor, and accordingly increase system speed.

Despite the enormous improvement in speed obtained from integrated circuitry, the demand for ever faster computer systems still exists. Hardware designers have been able to obtain still further improvements in speed by greater integration, by further reducing the size of the circuits, and by other techniques. Designer, however, think that physical size reductions cannot continue indefinitely and there are limits to continually increasing processor clock speeds. Attention has, therefore, been directed to other approaches for further improvements in overall speed of the computer system.

Without changing the clock speed, it is still possible to improve system speed by using multiple processors. The modest cost of individual processors packaged on integrated circuit chips has made this practical. The use of slave processors considerably improves system speed by off-loading work from the CPU to the slave processor. For instance, slave processors routinely execute repetitive and single special purpose programs, such as input/output device communications and control. It is also possible for multiple CPUs to be placed in a single computer system, typically a host-based system which services multiple users simultaneously. Each of the different CPUs can separately execute a different task on behalf of a different user, thus increasing the overall speed of the system to execute multiple tasks simultaneously.

It is much more difficult, however, to improve the speed at which a single task, such as an application program, executes. Coordinating the execution and delivery of results among multiple CPUs is a tricky business. For slave I/O processors, this is not so difficult because the functions are pre-defined and limited but for multiple CPUs executing general purpose application programs, it is much more difficult to coordinate functions because, in part, system designers do not know the details of the programs in advance. Most application programs follow a single path or flow of steps performed by the processor. While it is sometimes possible to break up this single path into multiple parallel paths, a universal application for doing so is still being researched. Generally, breaking a lengthy task into smaller tasks for parallel processing is done by a software engineer writing code on a case-by-case basis. This ad hoc approach is especially problematic for executing commercial transactions which are not necessarily repetitive or predictable.

Thus, while multiple processors improve overall system performance, there are still many reasons to improve the speed of the individual CPU. If the CPU clock speed is given, it is possible to further increase the speed of the CPU, i.e., the number of operations executed per second, by increasing the average number of operations executed per clock cycle. Recent advances towards this aim have yielded the superscalar computer which typically executes up to four instructions per processor clock cycle. A Very Long Instruction Word (VLIW) computer may execute sixteen instructions or more per processor cycle.

Various processor hardware design techniques have been used to increase the average number of operations executed per clock cycle. These have involved, for example, the use of pipelines, multiple execution units with look ahead hardware for finding instructions to execute in parallel, etc. Limited improvement is possible using these techniques, but the hardware support required is often massive. Another technique to improve the efficiency of hardware within the CPU is to divide a processing task into segments called threads. This technique is related to breaking a larger task into smaller tasks for independent execution by different processors except here the threads are to be executed by the same processor. When a CPU then, for any of a number of reasons, cannot continue the processing or execution of one of these threads, the CPU switches to and executes another thread.

The CPU is actually an arrangement of integrated circuits, including at least one instruction control unit and an arithmetic and logic unit, that interprets and executes computer instructions. Within the CPU there is a processor core containing specialized functional units, each of which perform primitive operations, such as sequencing instructions, executing operations involving integers, executing operations involving real numbers, transferring values between addressable storage and logical register arrays; those simple operations discussed earlier. Processor cores may have many of these specialized functional units either to achieve higher performance under peak requirements, or because the computer architecture requires more functional units. A single instruction or multiple instructions may dispatch operations to more than one functional unit in a single cycle of the processor's clock. In actuality, however, peak performance is rarely demanded; the duty cycle over time of any one functional unit is less than one hundred percent of the available clock cycles. Hence, there is idle time.

As discussed earlier, those parallel and sequential sets of instructions that can execute separately are called "threads of control" or, simply, "threads." A processor which has the capability to concurrently maintain more than one path of execution within a computer is called a multithreaded processor. The multithreaded processor usually has at least one backup register which has the data for a second thread while a first thread is executing. Commutation, also called context switch or thread switch, refers to the process of switching data and the state of certain registers associated with a particular thread out of one register set so that data and other state information associated with another thread can be switched into the first register set for execution. In a processor that doesn't support multithreading, however, context switch would swap data from one common set of operating registers with data in memory locations. The state of a thread includes all information necessary for a thread to execute.

The particular events that trigger the commutation of execution resources from one thread to another and the frequency of commutating threads are determined by the processor architecture and implementation. One of the events which may trigger a context or thread switch in a multithreaded system is an explicit call to a centralized executive program, such as an operating system, to execute another task. In this case, the state of the first task in the operating registers must be saved before the state of the second or called-to task is brought into the operating registers. In such a multi-tasking systems where the executive programs call for a thread switch, commutation may be so infrequent that hardware exclusively dedicated for rapid commutation is superfluous.

Occasionally an instruction stream requires information either from storage or a subsequent instruction in which the data is not available because, for instance, the value or the instruction may not be immediately accessible to the processor. The thread then is unable to continue execution. A multithreaded system may then commutate control of the processor core including the thread state registers to another thread while waiting for distant memory or another processor or another functional unit to provide the desired value or instruction. Latency is the time, often measured by processor cycles, required for data and/or instructions from these other components of the computer system to become available to the processor. Latency can further increase if coherency is required for the storage of data and/or instructions across a memory hierarchy. Commutation, therefore, is especially beneficial if a storage reference implies coherent operations involving shared memory multiprocessors, such as non-uniform memory access (NUMA), or other processors' caches or memories. In some of these instances, hardware support for switching threads is imperative when the latency to complete a shared memory reference is well bounded, i.e., it is on the order of tens to hundreds of cycles and the commutation is generally among only a few threads, e.g. two to four. The commutation frequency of a well-bounded latency, based on statistics such as a cache miss, is one-half to ten percent of the shared memory references missed.

Hardware support is also necessary for commutating or switching threads in a cooperative parallel processing system where more than one thread, possibly running on distinct processors, is cooperating to complete a single task. A processor may need to commutate when a value shared among threads is not in the desired state because, for example, another processor is currently working with a shared memory location that the specific processor needs to reference or that the required data is being calculated by another thread in another processor, or that the required data hasn't been verified yet, or that the data is stale. Thus, commutation may be triggered by an explicit synchronization instruction which fails, e.g., compare and swap; or a synchronization operation implicit in an instruction which references memory, such as a hybrid-dataflow. When instruction streams are more tightly coupled, such synchronization operations can occur at boundaries of ten to hundreds of instructions. Unlike the multi-tasking case above, however, the thread triggering commutation may need substantial time to allow computation of the results on which the commutation depends before it resumes. Other events which may trigger commutation of execution resources from one thread to another include expiration of a hardware timer typically set for thousands to millions of clock cycles; or reference to an I/O device with latencies of thousands to millions of clock cycles. Thus, with frequent commutation, poorly bounded resumption, or limited space for a thread state in the processor, hardware support to transfer thread state to and from storage is imperative.

The hardware in the processor core that actually transfers data between the processor core and a memory or other storage are called register/storage units. Data is explicitly transferred into a register/storage unit when an instruction "loads" data into a register within the processor core from memory in preparation for execution or when data is "saved", i.e., transferred from a register in the processor core to memory. Data can also be explicitly transferred by composite instructions such as "atomic save" or "restore" of thread state. An "atomic save" occurs when the data is stored to all visible memory in a multiprocessor system at once and no other stores or loads can impact a specified memory location until the atomic save has been completed. "Restoring" the thread state loads all registers in the processor core with data required by a processor thread state. On the other hand, data values are implicitly transferred by a register/storage unit when instructions utilize an addressing mode which references memory, e.g., add an immediate value of four to the value within a particular storage location and return the result to memory.

A conflict between execution and commutation is created when the same register/storage unit is used for storage operations denoted by an instruction and there is a simultaneous request, where implicit or explicit, to commutate a thread state between the processor core and storage. The conflict is easily resolved for systems using commutation to mask well-bounded latency, such as masking shared memory latency. In those systems and instances, it is usually sufficient to provide storage for several thread states within or close to the processor core. Commutation then need not traverse register/storage units.

For cooperative parallel processing systems, however, that commutate to mask coherency and synchronization delays, the number of threads unable to resume execution may become larger than the storage capacity within or close to the processor. The simplest solution is to suspend execution in order to commutate a thread state but this limits scalability for cooperative parallel processing. With tens to hundreds of registers, synchronization frequency of tens to hundreds of processor cycles and several register/storage units, synchronization can impose severe performance penalties, up to fifty percent. Suspending a processor's execution, moreover, restricts the size of a thread that parallelism gained by being able to execute multiple threds.

So an alternative solution to mask latency resulting from the coherency and synchronization requirement is to utilize additional register/storage units dedicated to commutation and buffering of state being commutated. As an example only, distinct hardware can provide for several threads: a thread state streaming out of the processor; a thread state actually executing; and a thread state streaming into the processor. Buffering these additional thread states reduces the performance impact of variances in the mean time between commutation. The RapidGraph parallel processor developed at Carnegie Mellon University and the Strand system from Philip's Laboratory are examples of such parallel machines. The static allocation of register/storage units to commutation, as in these machines, however precludes those register/storage units from being used to meet peak requirements of either execution or commutation. Conceptually similar, the functional units within the processor core of the Cray 2 computer transfer thread states between a register file and memory. Specific subsets of the register state are statically assigned to commutate threads to memory whenever a particular functional unit is not explicitly assigned a load or store operation by an instruction stream. Likewise, U.S. Pat. No. 5,404,469 entitled, "Multithreaded Microprocessor Architecture Utilizing Static Interleaving," to Chung et al. describes a processing system wherein the transfers of information between registers and memory are fixed and predetermined in time and in hardware. Because of all of these fixed and predetermined allocations, there can be no dynamic relationship between the register/storage units and the registers.

SUMMARY OF THE INVENTION

The invention disclosed herein partitions the memory bandwidth among programmed load/store operations and context switching. Use of register/storage units from the processor's pool are preferentially allocated to execution on a cycle by cycle basis, but when the register/storage units are not being used for execution, a "lazy" commutation of thread state between buffers within the processor core and storage is practicable.

It is thus an object of the invention to provide more effective parallel processing. This object is achieved by minimizing the time required to commutate thread states, and thus making it practical to execute smaller size threads making more parallelism available.

It is a further object of the invention to realize greater utilization of register/storage functional hardware. Greater utilization of register/storage hardware is accomplished because those register/storage facilities that are not used by the executing thread can be used to commutate data between memory and thread state buffer registers.

It is yet another object of the invention to reduce interface to the processor core dedicated to rapid thread commutation. In some of the previous mentioned inventions, extra register/storage units in addition to those used for execution are used to commutate thread state to and from memory. These additional register/storage units require interfaces to the processor and memory. Our invention uses register/storage units that can be utilized for execution or commutation of thread state. The interfaces are already there for use by the executing processes.

It is still another object of the invention to mask shared memory and synchronization latency without substantially complicating the interface between the processor core and storage in shared memory multiprocessors, message-based multiprocessors, and hybrid dataflow parallel processors.

These and other objects and features of the invention will be apparent by a computer system having an operating system and processor and a method of operating that computer system wherein the processor is functionally connected to an operating system and the processor has at least one register set having a plurality of registers, which could be a thread register buffer set or an executing thread register, to store a state of at least one thread; the computer system has at least one memory, which may be either internal to the processor or an external memory, to store data and instructions associated with at least one of the threads; the processor has at least one register/storage unit connected to the register sets and to the memory to transfer the state of the threads between memory and one of said register sets when the register/storage unit is not otherwise explicitly assigned to transfer data between the register sets and memory.

The computer system and processor also has an instruction control register functionally connected to the register/storage units and to memory which receives instructions from memory and transfers instructions to the register/storage units, some of the instructions which the instruction control register receives from memory need not be executed in a next clock cycle of said processor, and so are marked as being an idle instructions.

The inventive computer system and processor further comprises a context switch unit functionally connected to each of the register/storage units to generate and transfer a context switch instruction to the register/storage units. The context switch unit has as many thread status registers as the processor is capable of storing in which the status of each thread in the processor is stored, at least one counter capable of keeping track of the state of the thread to be switched, and at least one address register of where to find the thread state to be switched. The context switch register is also functionally connected with the instruction control register and receives a signal indicating that the instruction control register has an idle instruction. In response thereto, the context switch register transfers a context switch instruction to one of the register/storage units to transfer the state of a thread corresponding to one of its thread status registers either into or out of one of register sets, or into or out of memory.

It is envisioned that the memory includes internal memory units such as caches and buffers, as well as memory external to the processor but still within the computer system such as random access memory or direct access storage devices, or memory external to the computer system such as networked computer systems.

Without a doubt the invention is a computer system capable of interleaving operations associated with more than one thread of execution to transfer on demand the thread state between one of the register sets and a memory as dynamically assigned whenever a register/storage units is not explicitly assigned a load or store operation by an instruction stream into the processor.

The invention is also a method of switching thread states in a multithreaded processor in which at least one idle instruction into input in a processor; independently, a context switch unit within the processor is signalled that a thread state is about to be switched and is further signalled that the at least one idle instruction is present. The context switch unit creates a context switch instruction which denotes the size and the address of the thread to be switched. Optionally the context switch unit indicates the priority of the thread to be switched. The context switch instruction is sent to an idle register storage unit that is idle because the at least one idle instruction is present. As a result of the context switch instruction, the register storage unit switches the thread associated with that context switch instruction either into or out of a thread register set in the processor or either into or out of memory. After the first thread is switched, usually out of the processor's thread registers, the context switch unit generates a second context switch instruction having location, size and, optionally, priority of a second thread and then sends this second context switch parcel to an idle register storage unit, which may be the same or a different idle register storage unit as involved in the transfer of state of the first thread. The idle register storage unit switches the thread state of a second thread in the processor, again either into or out of the processor's thread registers or into or out of memory.

The invention, thus summarized, and its preferred embodiment will be further described in relation to the following drawings and detailed description.

DESCRIPTION OF THE INVENTION

Figure 1:
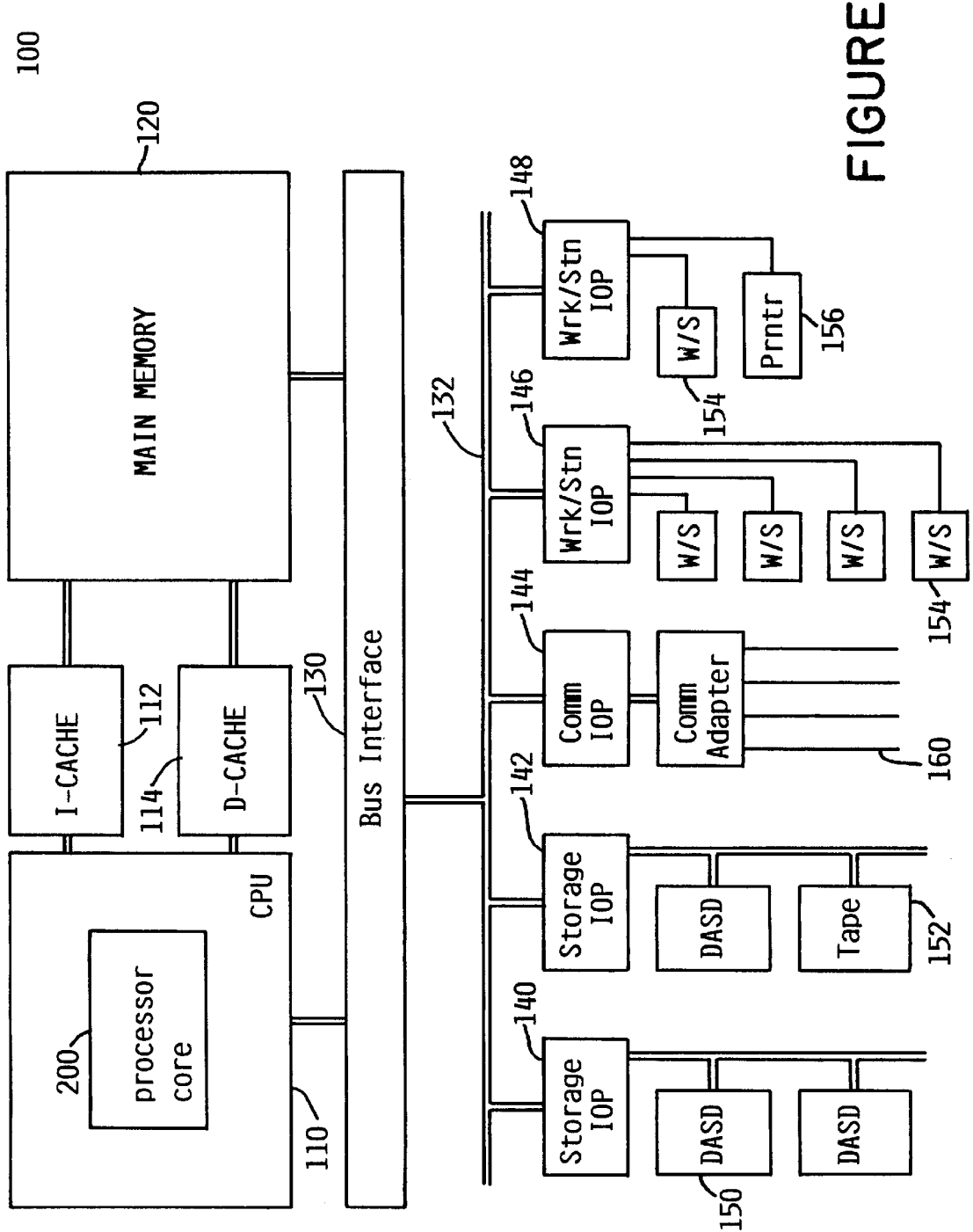
FIG. 1 is a block diagram of a generic computer system capable of implementing the invention described herein.

The primary hardware components and interconnections of a computer system 100 capable of utilizing the present invention are shown in FIG. 1. Central processing unit (CPU) 110 for processing instructions is coupled to separate caches 112 and 114. Instruction cache 112 stores instructions for execution by CPU 110. Data cache 114 stores data to be used by CPU 110. Both caches communicate with random access main memory 120. CPU 110 and main memory 120 also communicate via bus interface 130 with system bus 132. Various input/output processors (IOPs) 140–148 attach to system bus 132 and support communication with a variety of storage and input/output (I/O) devices, such as direct access storage devices (DASD) 150, tape drives 152, workstations 154, printers 156, and remote communication lines 160. It should be understood that FIG. 1 is intended to depict representative components of a computer system 100 at a high level, and that the number and types of such components may vary.

Figure 2:
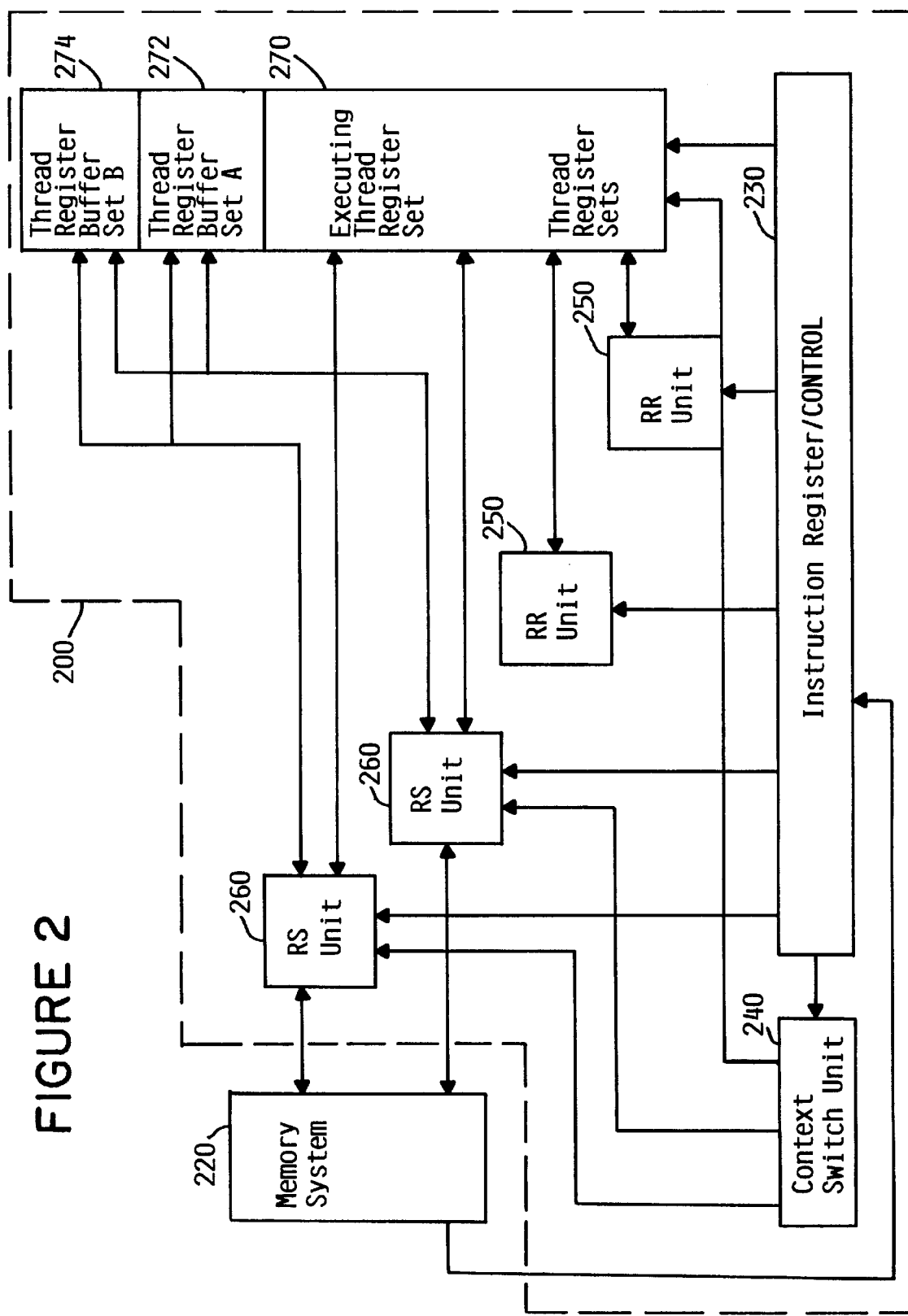
FIG. 2 is a functional block diagram of a processor core and memory system of the computer system of FIG. 1.

Within the CPU 110, a processor core 200 contains specialized functional units, each of which perform primitive operations, such as sequencing instructions, executing operations involving integers, executing operations involving real numbers, transferring values between addressable storage and logical register arrays. FIG. 2 illustrates a processor core 200 and a memory system 220. Memory system 220 may or may not be within the processor core 200 and, as illustrated in FIG. 2, memory system 220 is external to the processor core 200; for purposes of this invention, memory system 220 comprises random access main memory 120, and other data buffers and caches, if any, external to the processor core 200, and other external memory, for example, DASD 150, tape drives 152, and workstations 154, shown in FIG. 1.

Returning now to FIG. 2, processor core 200 comprises at least an instruction register/control 230, a context switch unit 240, several register/register (RR) units 250, several register/storage (RS) units 260, and thread register sets 270, 272, 274. Inside each thread register set 270, 272, 274 are a number of specialized registers and components; the minimum being a general purpose register, one or more special purpose registers, a multiplier, a floating point register, and an arithmetic logic unit. Register/register units 250 and register/storage units 260 generally access the general purpose registers and the floating point registers from the executing thread register set 270. Register/register execution units 250 are operatively connected to receive instructions from the instruction register/control 230 and to transfer executed instruction results which do not require access to the memory system 220 into and out of the executing thread register set 270. Two register/register units 250 are illustrated in the embodiment shown in FIGS. 2 and 3, however, there can be as few as one or as many of these units as necessary or as defined by the computer architecture. Similarly, there can be few or numerous register/storage units 260 which perform instructions including those instructions that access the memory system 220. For the lazy context switching of the invention the register/storage units 260 read and write data from the thread register buffer sets 270, 272, and 274 and memory system 220, as enabled by the instruction register/control 230 and the context switch unit 240. Register/storage units 260 also receive normal instructions from the instruction register/control 230. Memory system 220 comprises the locations where the thread register states reside when not in the processor core 200. The state of a thread refers to the contents of the register files necessary for an instruction set capable of independent execution, called a thread, to execute. Of course, the state of a thread depends upon the processor architecture and implementation and, as an example only, a state can include the contents of a general purpose register file, a floating point register file, and other registers critical to the correct operation of the processor such as condition code registers, machine state registers, link and count registers, next instruction address register, exception registers, etc.

The processor core 200 provides storage for the state of at least one thread executing in the executing thread register set 270 and at least one or more threads in a passive state, meaning the thread is not being currently modified by executing instructions. Thread register buffer sets 272 and 274 contain the thread states for passive threads which may have previously executed in the processor core 200, or may be awaiting execution, or both as in a short-stop avoiding commutation to storage. The number and size of the thread register buffer sets 272 and 274 is determined by the inherent processor definition, at least two thread register buffer sets are necessary and more is generally better. The size of the buffer sets must be large enough to hold the entire state required for correct and complete operation of the processor and the number of threads and register buffer sets are determined by chip size, complexity, power requirements, cost, etc. For purposes of this discussion, there are three threads possible: one executing in the executing thread register set 270; a passive thread A in thread register buffer set 272; and a passive thread B in thread register buffer set 274. If there were only two threads, then there would be only one executing thread register set 270 and one thread register buffer set 272 or 274. The invention, as disclosed herein, envisions, however, that there is at least one, probably more passive thread register buffer sets and more than one executing thread register set.

The instruction register/control 230 can be an instruction cache or a fixed readonly memory (ROM). The instruction register/control 230 contains the machine level instructions executing during a particular clock cycle and, in the absence of conflict or stall conditions, the instruction register/control 230 is loaded with new instructions each clock cycle. The instruction register/control 230 fetches instructions from the memory system 220 and is capable of presenting an executable instruction each cycle to each register/register unit 250 and to each register/storage unit 260. The instruction register/control 230 also presents the proper decodes to the register/register units 250 to read or write to the executing thread register set 270 and, in the case of register/storage units 260, also to the thread register buffer sets 272, 274. The instruction register/control 230 also detects instructions for the register/storage units 260 that will not be executed immediately and so are idle. During these idle cycles, the register/storage units 260 may be filled with lazy context switch instructions, the subject of the invention herein.

Figure 3A:
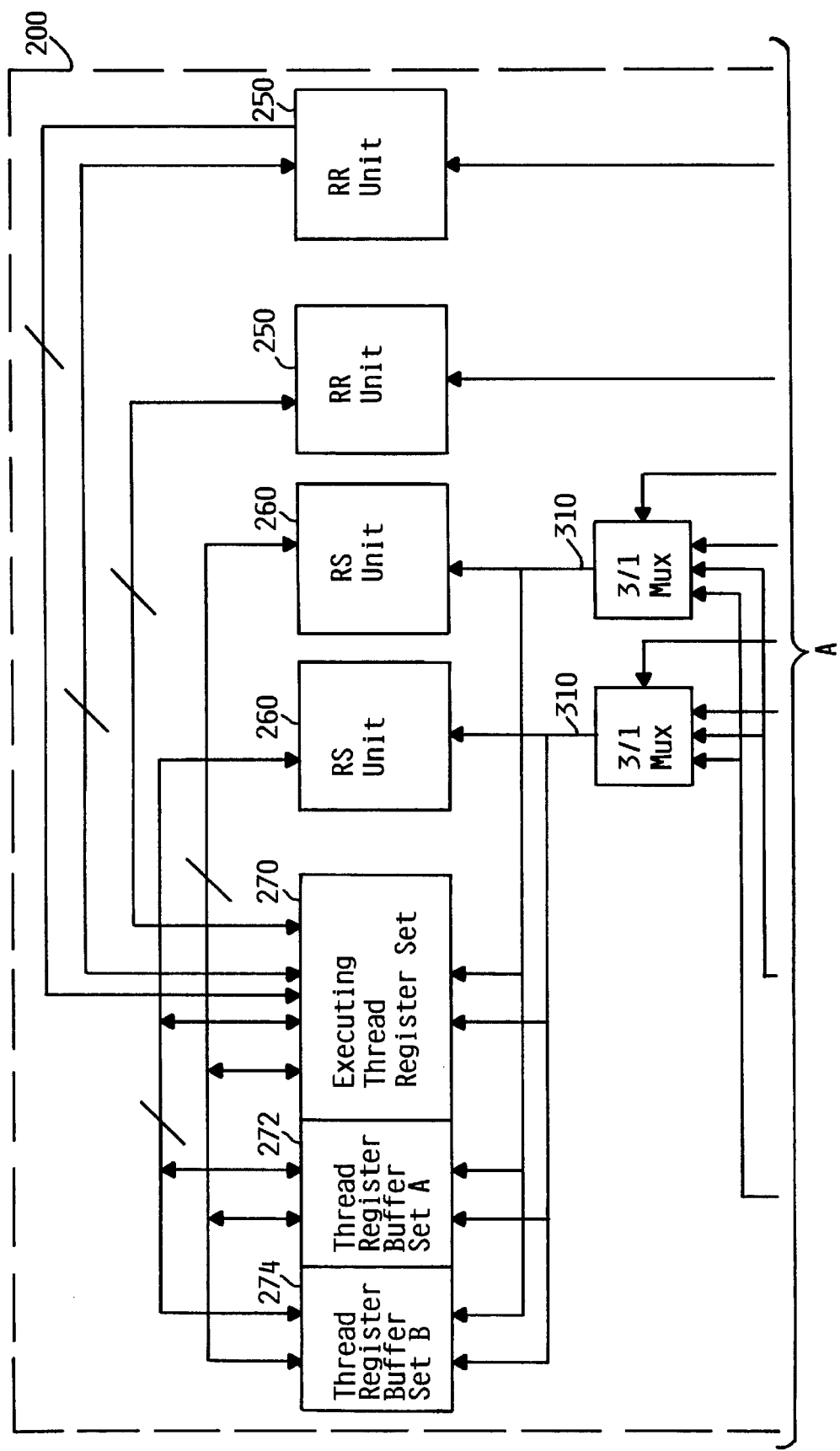
FIG. 3 is a functional block diagram showing in greater detail the components and the data and control paths of the computer system of FIG. 2.
Figure 3B:
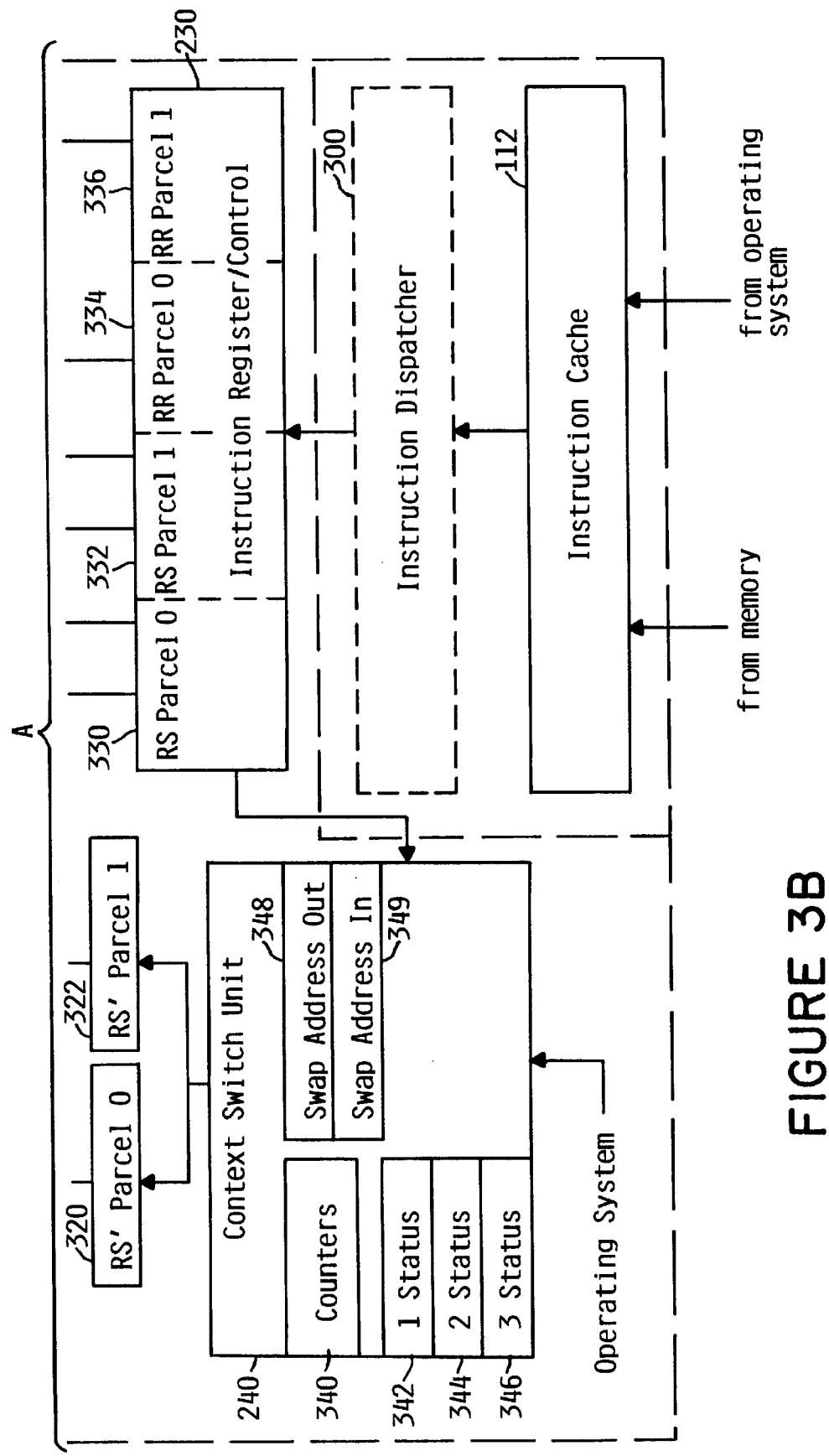

Shown in FIG. 3 is a functional block diagram of a processor core 200 in greater detail which illustrates the control and the data flow of lazy context switching. In FIG. 3, the instruction register/control 230 has four instructions 330, 332, 334, 336, but it may have from one to N instructions. In a Very Long Instruction Word (VLIW) machine, a four or N-wide word has four or N instructions which are independently scheduled by hardware for parallel execution. The VLIW is generated by either a hardware preprocessor or a VLIW parallelizing compiler and is loaded directly into the instruction register/control 230 from an instruction cache 112. The N-wide VLIW instruction is executed in one clock cycle in the processor. In a superscalar processor, an instruction dispatcher 300 is placed between the instruction cache 112 and the instruction register/control 230. The instruction dispatcher 300 decodes the stream of instructions and stages from one to four instructions to be executed during the next cycle. The instruction dispatcher 300 also determines that an instruction is lazy or idle, i.e., that the instruction need not be executed in the next cycle and so the instruction dispatcher 300 marks these instructions. One method of marking an idle instruction is to add a special bit to the instruction. This bit would be inserted by the instruction dispatch unit in a superscalar machine. It would be inserted by a VLIW compiler in a VLIW machine. The presence of the bits make it unnecessary for the hardware to decode the standard no-op instruction to determine if the RS instruction is idle. A no-op could also be decoded. The instruction register/control 230 also reads the required signals from the unmarked register/storage parcels 330, 332 to the register/storage units 260 via the 3/1 multiplexer 310 to the register/storage units 260 and thread register sets 270, 272, 274. The instruction register/control 230 also signals the context switch unit 240 that register/storage parcels 330, 332 are idle.

The context switch unit 240 shown in FIGS. 2 and 3 is operatively connected to the operating system and the instruction register/control 230. The context switch unit 240 is also connected to the register/storage units 260 and the thread register sets 270, 272, and 274 via 3:1 multiplexers 310. The operating system signals the context switch unit 240 that a thread swap is required. The context switch unit 240 supplies the information needed by the register/storage units 260 and the thread register sets 272, 274 to perform lazy context switching in the form of context switch parcels 320, 322.

The context switch unit 240 has special purpose registers which are filled and read by the operating system and its software task dispatcher and interrupt routines. The swap-address-out register 348 contains the starting location in memory or other location of the thread whose thread swap request bit is set. The swap-address-in register 349 contains the starting location in memory of other location for the thread whose thread swap request bit is set. The context switch unit 240 also contains registers 342, 344, 346, one for each thread in the processor core 200, which identify the thread number (1, 2, 3) and the status of that thread. The thread status bits for each thread include:

thread active/not active;

thread enabled/not enabled;

thread swap in process/not in process;

thread swap request;

thread swap out active;

thread swap in active.

Counters 340 in the context switch unit 240 provide the address, preferably in either thread register buffer set 272, 274, of where to put a thread state. Counters 340 also count the number of registers required for the thread swap. Counters 340 are first loaded with the starting address of the thread to be swapped and are incremented by the number of operations staged into the context switch parcels 320, 322. One implementation is to have two counters because there are two potential register/storage parcels used for swapping. One counter would count all even register swaps, the other would count all odd register swaps. Alternatively, the instruction register/control 230 may dynamically assign subsets based on the availability of register/storage functional units 260.

Context switch or thread switching of the invention can be illustrated by any of the following examples: thread state B is to be moved from thread register buffer 274 to the executing thread register set 270. Typically, however, multithreaded machines swap either thread register buffer set A 272 or set B 274 with the executing thread register set 270 in as little as one clock cycle entirely within the thread register buffer sets 272, 274 and the executing thread register set 270. Another alternative is that either thread register buffer set A 272 or set B 274 can be swapped with the state of another yet unnamed thread state residing in memory. This swap is possible while the executing thread continues operation. Also, an executing thread is swapped to a register/storage unit 260 and to memory 220 and one of the thread states in thread register buffer A 272 or B 274 is moved to the executing thread register set 270. If there are only two active threads, the executing thread state in executing thread register set 270 is first moved to a register/storage unit 260 and then either thread state A or B in thread register buffer 272 and 274, respectively is moved into the executing thread register set 270. The operating system may also choose to swap one of the thread states in thread register buffer 272 or 274 with another thread state in memory or in a location in the same processor, the same computer, or a distant location which for purposes of illustration only and not to be limiting, can be another workstation or a DASD.

In any event, a thread must stop executing before it can be swapped. The instruction register/control 230 ensures that interlocks are present while a buffered state is being commutated in or out of the executing thread register set 270 so that the thread state cannot be referenced for execution purposes or reused for a new state.

To initiate the lazy context switching of the invention, two events must occur. First, prior to loading the instruction register/control 230, the VLIW compiler or, in the case of a superscalar, the instruction dispatcher 300 marks instructions 330, 332 as being idle in particular cycle(s). Instructions 330, 332 can be filled with a normal no-op code which can be decoded at the time the instruction cache 112 is filled. Alternatively, one extra bit per register/storage instruction parcel 330, 332 placed in the instruction cache 112 is used to select signals through the 3 to 1 multiplexers 310; this facilitates implementing lazy context switching with minimum delay. The second event to occur is that the operating system communicates to the context switch unit 240 to switch threads. Thus, the two events that must temporally coincide, although they need not be simultaneous, is that the context switch unit 240 must have context switch parcels 320, 322 ready for transfer to the register/storage units 260; and second, the instructions 330, 332 in instruction register/control 230 must be idle.

Normal register/storage instructions 330, 332 and the context switch parcels 320, 322 are multiplexed in the cycle after the instruction register/control 230, as in a superscalar machine. In a VLIW implementation, however, multiplexing is done between the instruction cache 112 and the instruction register/control 230 which has less cycle time impact. Acting as a centralizing agent, the instruction register/control 230 initiates the process by which each register/storage unit 260 transfers a fixed subset of a bufferer state. There is no intentional effort to assure that idle register/storage instructions 330, 332 are inserted; the fact that register/storage instructions 330, 332 are idle is a normal event and lazy context switching takes advantage of these idle register/storage instructions 330, 332 to do extra work. If there are insufficient idle register/storage instructions 330, 332 to perform a requested lazy context switch during the execution of a currently executing thread interval, appropriate interlock control in either the instruction register/control 230 or the operating system may temporarily postpone the completion of the lazy context switch if there are no resource conflicts in the thread register buffer sets 270, 272, 274 or stop the processor and force the completion of the lazy context switch before continuing processor execution.

Figure 4A:
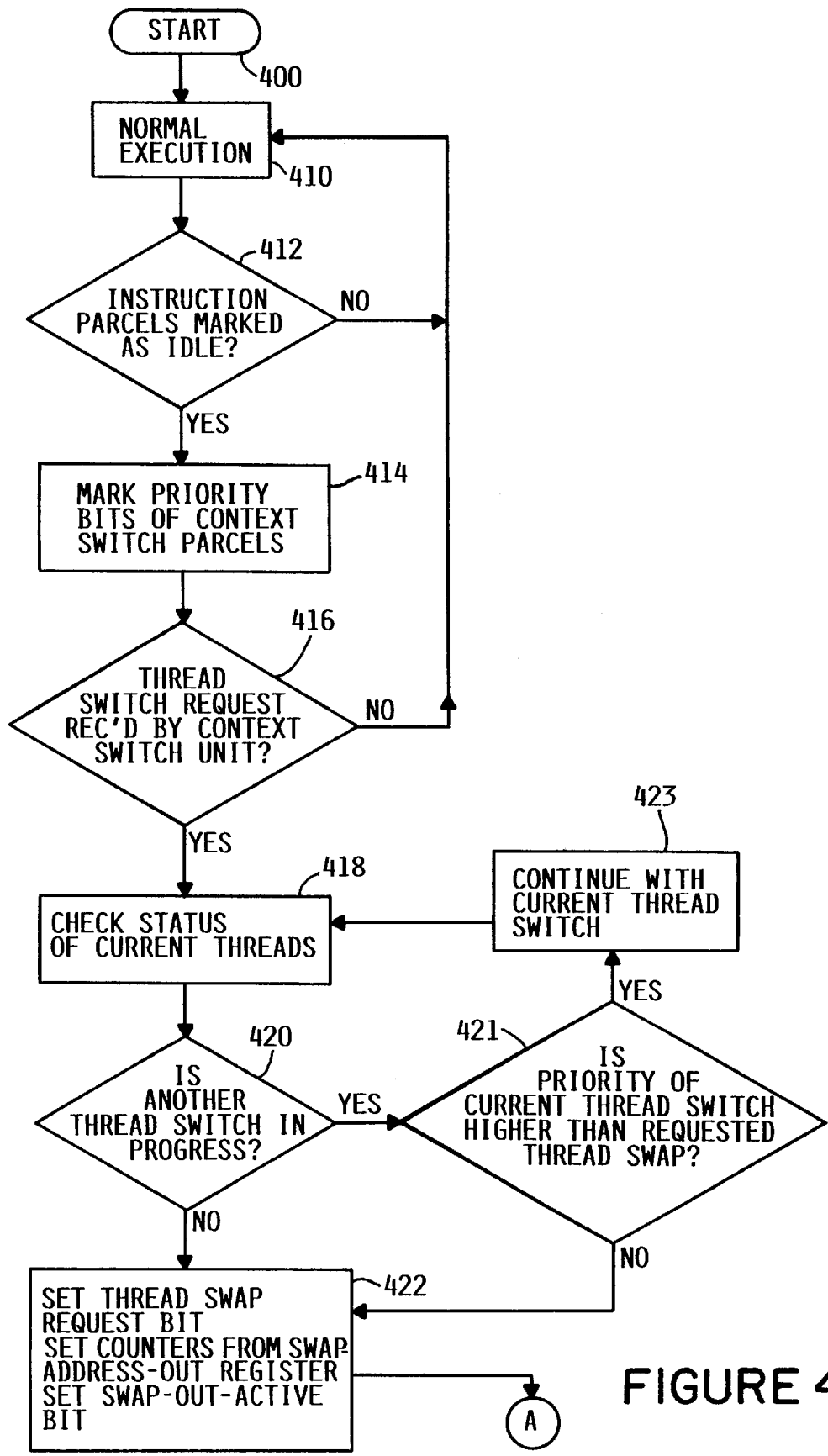
FIG. 4 is a flow chart of the operation of the lazy context switching of the invention.
Figure 4B:
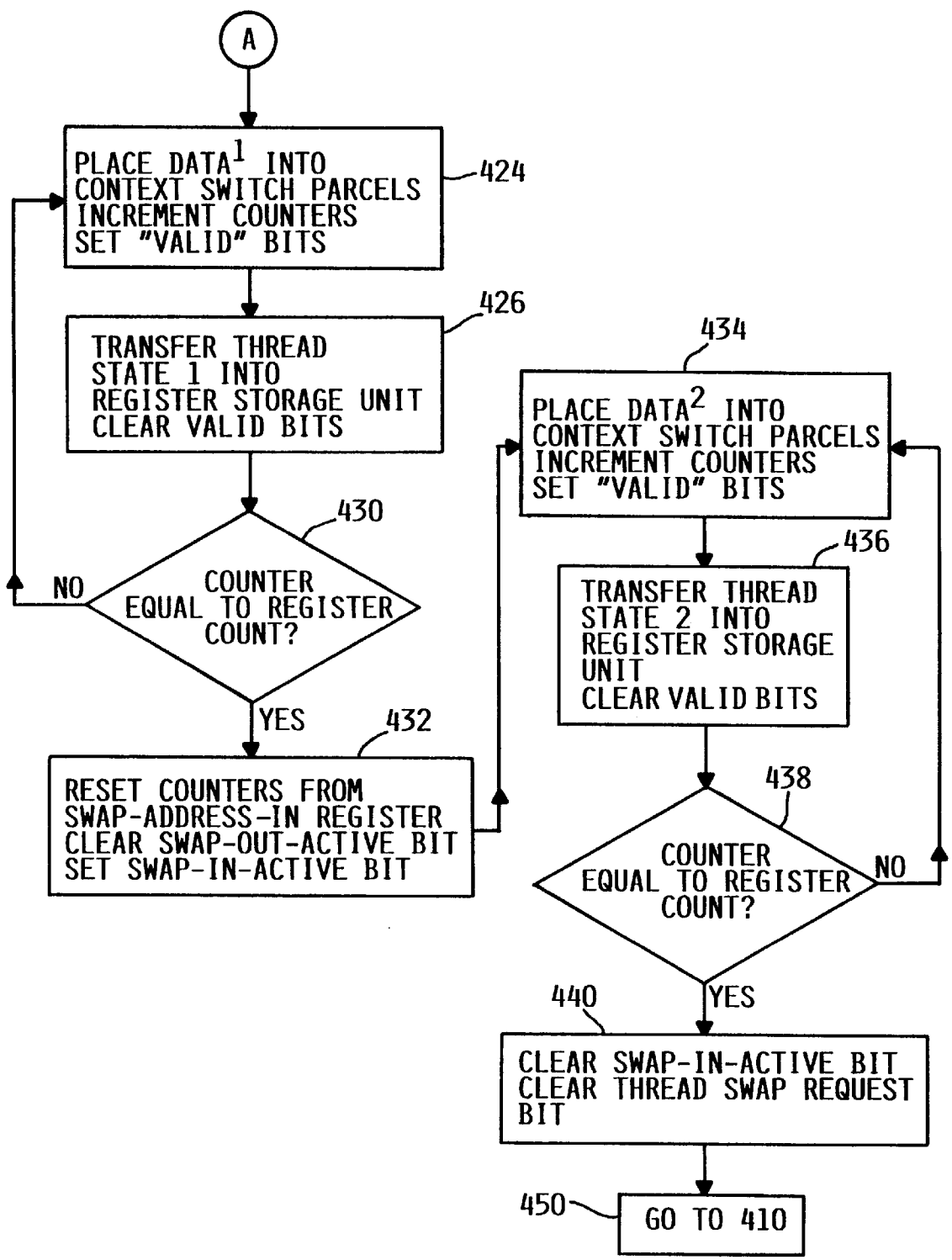

With reference to FIGS. 3 and 4, the lazy context switching operation is described in more detail. Lazy context switching starts at step 400 in FIG. 4 with a normal instruction flow, step 410, with unmarked register/storage instructions being gated through multiplexers 310 to the register/storage units 260 and the executing thread register set 270. Then, in step 412, one or more idle register/storage instructions 330, 332, previously marked as being idle by the hardware preprocessor or parallelizing compiler, enter the instruction register/control 230. Because idle marks are present in the register/storage instructions 330, 332, priority bits of the context switch parcels 320, 322 are set, as in step 414. At step 416, the operating system signals the context switch unit 240 when a context switch is desired and sets the thread swap request bit in the one of the registers 342, 344, 346 pertaining to the thread to be switched. On every cycle, the context switch unit 240 checks those thread swap request bits to determine if a lazy context switch has been requested by the operating system. If a request is detected and if a swap is not currently in progress or if a thread swap is currently in progress but has a lower priority, steps 418, 420 421, the operating system sets the thread swap request bit in one of status register 342, 344, 346 for the thread to be swapped, as in step 422, and sets the counters 340 to the value from the swap-address-out register 348 indicating where to find the thread state to be moved out and the number of registers to be switched. If another swap is in progress with a higher priority, the current swap continues until complete as in step 423 and then the operation resumes at step 418. The thread swap out active bit is set in the corresponding thread state register 342, 344, 346. The lower bits of counters 340 are checked to determine if the total number of registers have been swapped.

In step 424, the context switch unit 240 also places the following information in context switch parcels 320, 322:

For stores: (Read from thread register and store to memory system)
Store opcode (double word store with 0 displacement)
The register to read from
The thread register set A or B 272, 274 to read from
The memory location to save to.

To make sure context switch operations stay in order, there is an optional priority bit for each context switch parcel 320, 322. If a previously staged context switch parcel 320, 322 remains valid, it is given priority the next cycle. This optional feature of maintaining thread priority is maintained by either software routines or, as previously stated, by priority bits in the thread status registers 342, 344, 346.

"Valid" bits are set in the thread status register 342, 344, 346 corresponding to the switching thread to acknowledge that the thread state is valid and ready for switching and the counters 340 are incremented. In step 426, the data contained in the context switch parcels 320, 322 is gated by the context switch unit 240 through the 3/1 multiplexers 310 to the register/storage units 260 to move the first thread state out of one of the following:

thread register buffer sets 272 or 274. The "valid" bit(s) are cleared for those context switch parcels 320, 322 whose operations were executed.

The method determines if the incremented value in the counters 340 accounts for the number of registers to be moved. If more registers are to be moved, the thread switch is not complete and the activity continues to step 424. When the counters 340, however, indicate the complete thread state has been swapped, i.e., if the total number of registers have been transferred, as in step 430, the counters 340 are cleared and reset from the swap address in register 349. The context switch unit 240 clears the thread swap out active bit for that first thread and uses the address in the swap-address-in register 349 to find the thread state that needs to be moved in, shown in step 432. The context switch unit 240 increments the counters 340, sets the "valid" bits, and sets the thread swap in active bit for that second thread as in step 434. Then in step 434, the context switch unit 240 further places the following information in context switch parcels 320, 322:

For loads: (Read memory system and write into thread registers)
Load opcode (double word load with 0 displacement)
The target register to fill
The thread register set A or B 272, 274 to store into
The memory location to fetch from.

"Valid" bits are set to acknowledge that the second thread state to be swapped-in is valid and ready for switching and the counters 340 are incremented, represented in step 434. In step 436, the second thread state referenced by the context switch parcels 320, 322 is gated by the context switch unit 240 through the 3/1 multiplexers 310 from the register/storage units 260 to either one of the thread register buffer sets 272, 274 or the executing register set 270. When the second swap is complete, the context switch unit 30 clears the thread swap in active bit and clears the thread swap request bit for that thread as in step 440 and then normal execution resumes as in steps 450 and 410.

Lazy context switch operations are staged by the context switch unit 240 based on the number of register/storage 330, 332 which are idle at a particular time. Any combination of zero, one, or more switch operations can occur in a given cycle depending on the idle states in the register/storage parcels. Lazy context switching does not always occur consecutively; rather the switching is interspersed with normal instruction flow and occurs when there is an idle cycle which in most instances is unpredictable. It is, however, within the purview of the invention to intentionally program or insert idle instructions 330, 332 in the instruction flow to facilitate lazy context switching.

While the present invention has been described with respect to an exemplary embodiment thereof, it will be understood by those of ordinary skill in the art that variations and modifications can be effected within the scope and spirit of the invention.

What is claimed is:

1. A computer processor functionally connected to an operating system, comprising
   (a) at least one register set having a plurality of registers to store a state of at least one thread;
   (b) at least one memory unit to store data and instructions associated with at least one of said threads;
   (c) at least one register/storage unit connected to one of said register sets and to at least one of said memory units to transfer the state of one of said threads between one of said memory units and one of said register sets when one of said register/storage units is not otherwise explicitly assigned to transfer data between one of said register sets and one of said memory units;
   (d) an instruction control register functionally connected to each of said register/storage units and functionally connected to one of said memories, said instruction control register to transfer instructions to each of said register/storage units in which at least one of said instructions to be transferred to one of said register/storage units need not be executed in a next clock cycle of said processor, and so is marked as being an idle instruction; and
   (d) a context switch unit functionally connected to each of said register/storage units to transfer a context switch instruction to one of said register/storage units wherein said context switch unit comprises
      (i) at least one thread status register;
      (ii) at least one counter; and
      (iii) at least one address register
         wherein a status of a first thread to be switched is stored in one of said thread status registers, and an address of said first thread is located in said address register and the size of said first thread is indicated by said at least one counter, and
         said context switch register receives a signal indicating said instruction control register received said idle instruction and in response thereto said context switch register transfers said context switch instruction to one of said register/storage units and in response to said context switch instruction, one of said register/storage units transfers said state of said first thread between one of said memory units and one of said register sets.

2. The computer processor of claim 1, wherein one of said memory units is uniquely associated with said computer processor.

3. The computer processor of claim 1, wherein one of said memory units is shared with more than one computer processor.

4. The computer processor of claim 1, wherein one of said register sets is an executing thread register set.

5. The computer processor of claim 1, wherein one of said register sets is a thread register buffer set.

6. A context switch unit within a processor core of a multithreaded computer system having a memory, said processor core also comprising an instruction control register through which instructions enter said processor core for execution, at least one register/storage unit for transferring data and instructions into and out of at least one executing thread register; all of which are functionally connected to each other and to said context switch unit, said context switch unit comprising:
   (a) at least one thread status register;
   (b) at least one counter; and
   (c) at least one address register
      wherein a status of a first thread is stored in one of said thread status registers, and an address of said first thread to be switched is located in said at least one address register and the size of said first thread is indicated by said at least one counter, and
      said context switch unit arranges for the state of said first thread to be switched into or out of said executing thread register set when said instruction control register signals that one of said register/storage units is not otherwise executing an instruction other than a no-op instruction.

7. The context switch unit of claim 6 wherein said context switch unit creates a context switch parcel to be communicated to said register/storage unit; said context switch instruction comprising: an opcode to move said first thread; and address from which to move said first thread; and a second address to which to move said first thread.

8. A computer processor functionally connected to an operating system, comprising
   (a) at least one register set having a plurality of registers including at least one executing thread register to store a state of at least one thread;
   (b) at least one memory unit to store data and instructions associated with at least one of said threads;
   (c) at least one register/storage unit connected to one of said register sets and to at least one of said memory units to transfer the state of one of said threads between one of said memory units and one of said register sets when one of said register/storage units is not otherwise explicitly assigned to transfer data between one of said register sets and one of said memory units;
   (d) an instruction control register functionally connected to each of said register/storage units and functionally connected to one of said memories, said instruction control register receives instructions from one of said memories to transfer instructions to each of said register/storage units, and at least one of said instructions to be transferred to said register/storage unit need not be executed in a next clock cycle of said processor, and so is marked as being an idle instruction;
   (e) a context switch unit functionally connected to each of said register/storage units to transfer a context switch instruction to one of said register/storage units, said context switch unit also functionally connected with said instruction control register to receive a signal indicating said instruction control register received said idle instruction, said context switch unit having at least one thread status register which contains the status of a first thread to be switched is stored; at least one counter indicating the size of said first thread; and at least one address register having a first address and a second address of said first thread wherein in response to said signal indicating said instruction control register received said idle instruction, said context switch unit transfers said context switch instruction comprising an opcode to move said first thread, and said first address from which to move said first thread, and said second address to which to move said first thread to one of said register/storage units to transfer said state of said first thread from said first address to said second address.

9. A method of switching thread states in a multithreaded processor, comprising:

(a) inputting at least one idle instruction into an instruction control register of said processor;

(b) signalling a context switch unit in said processor that a first thread state is about to be switched;

(c) said instruction control register signalling said context switch unit that said at least one idle instruction is present;

(d) said context switch unit creating a context switch instruction comprising: an opcode to switch threads, a first address of where said first thread state resides, a second address of where said first thread state is destined;

(e) sending said context switch instruction to a register storage unit that is idle because said at least one instruction is present;

(f) switching said first thread state;

(g) signalling a context switch unit in said processor that a second thread state is about to be switched;

(h) said instruction control register signalling said context switch unit that at least one idle instruction is present;

(i) said context switch unit creating a second context switch instruction comprising: an opcode to switch threads, a third address of where said second thread state resides, a fourth address of where said second thread state is destined;

(j) sending said context switch instruction to a register storage unit that is idle because said at least one idle instruction is present;

(k) switching said second thread state.

* * * * *